United States Patent

Park et al.

[11] Patent Number: 5,167,293
[45] Date of Patent: Dec. 1, 1992

[54] FULL TIME FOUR WHEEL DRIVE SYSTEM

[75] Inventors: Sang Chul Park; Shin Sang Lee, both of Yongin-Kun, Rep. of Korea

[73] Assignee: Hyundai Motor Company, Seoul, Rep. of Korea

[21] Appl. No.: 803,900

[22] Filed: Dec. 9, 1991

Related U.S. Application Data

[63] Continuation of Ser. No. 548,262, Jul. 5, 1990, abandoned.

[30] Foreign Application Priority Data

Dec. 30, 1989 [KR] Rep. of Korea ............. 89-20426[U]

[51] Int. Cl.⁵ .......................................... B60K 17/346
[52] U.S. Cl. .................................. 180/248; 180/249; 475/221; 475/231
[58] Field of Search ............... 180/233, 247, 248, 249, 180/250; 475/221, 231

[56] References Cited

U.S. PATENT DOCUMENTS

| | | | |
|---|---|---|---|
| 4,763,749 | 8/1988 | Miura et al. | 475/221 X |
| 4,802,383 | 2/1989 | Katayama et al. | 180/249 |
| 4,862,769 | 9/1989 | Koga et al. | 180/248 X |
| 4,895,236 | 1/1990 | Sakakibara et al. | 180/247 |
| 4,911,260 | 3/1990 | Miura et al. | 475/221 X |
| 5,083,635 | 1/1992 | Tashiro | 180/248 |

FOREIGN PATENT DOCUMENTS

| | | | |
|---|---|---|---|
| 0077231 | 4/1987 | Japan | 180/248 |
| 0291731 | 11/1988 | Japan | 180/249 |
| 0032924 | 2/1989 | Japan | 180/249 |
| 0018121 | 1/1990 | Japan | 180/249 |

Primary Examiner—Mitchell J. Hill

[57] ABSTRACT

A full time four wheel drive system has a housing in the vicinity of an engine and a transmission, a central differential gear assembly and a viscous coupling assembly containing a front differential gear assembly. The central differential gear, front wheel differential gear, and viscous coupling assemblies are disposed in parallel relationship within the housing for uniformly distributing the load of axle and drive shafts according to the road conditions. The system has a simple structure and economically uses the space in the engine compartment.

3 Claims, 2 Drawing Sheets

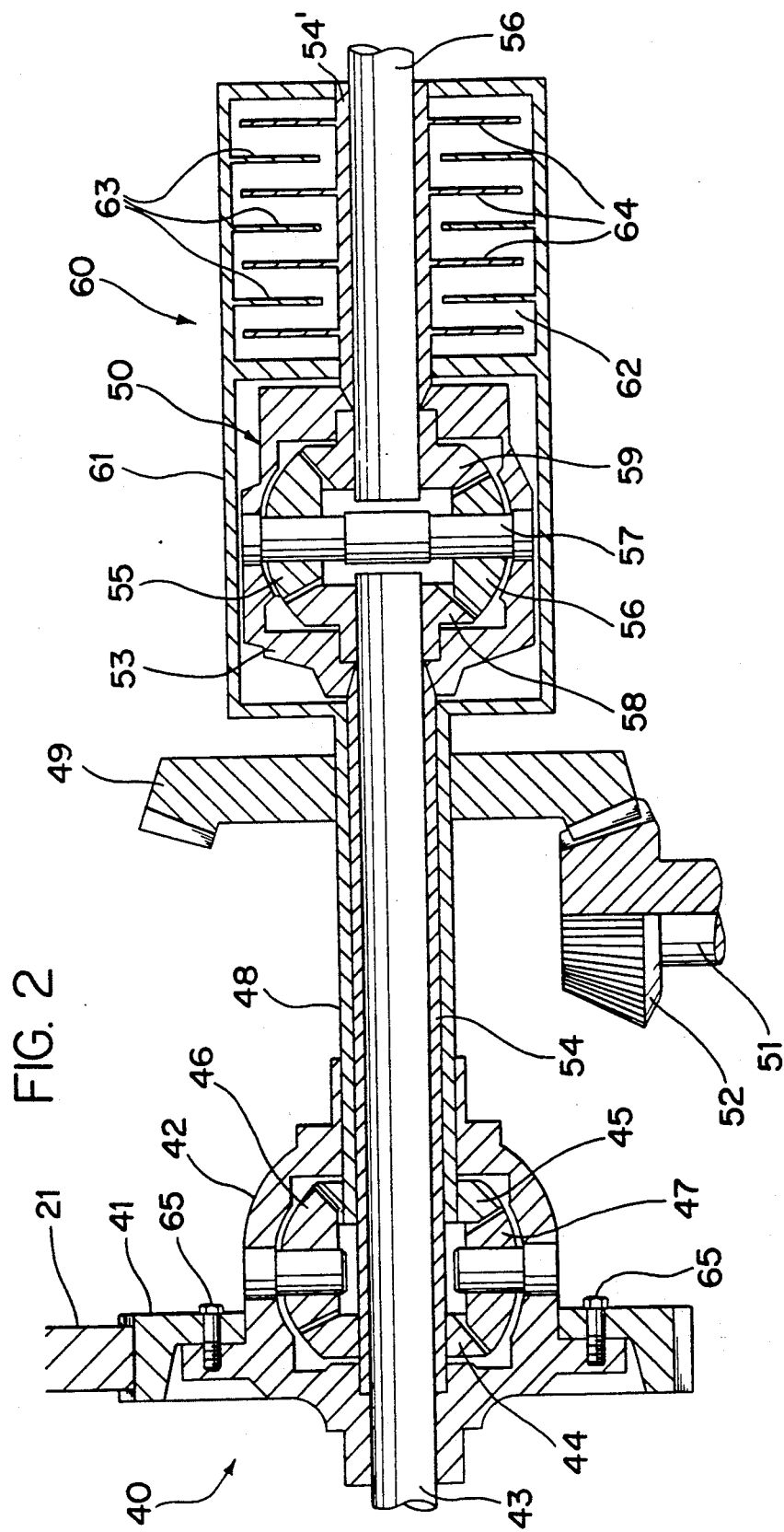

FULL TIME FOUR WHEEL DRIVE SYSTEM

This application is a continuation of application Ser. No. 07/548,262 filed Jul. 5, 1990 now abandoned.

BACKGROUND OF THE INVENTION

1. Field of the Invention

The present invention relates to a full time four wheel drive system for use in a vehicle and more particularly, to an improved four wheel drive system including a housing in the vicinity of a transmission and an engine, a central differential gear assembly, a viscous coupling assembly, and a front wheel differential gear assembly disposed in a parallel relationship within the housing for effectively operating the four wheel drive system.

2. Description of the Prior Art

Various types of full time four wheel drive systems in front wheel drive vehicles are well known in the art. Such four wheel drive systems include a front wheel differential gear, a rear wheel differential gear, and a center differential gear and a viscous coupling for distributing power to both front wheel and rear wheel differential gears. Such a viscous coupling contains a cylindrical container having a pair of discs with a plurality of apertures disposed on the discs. A plurality of pairs of discs are alternatively stacked with respect to each other wherein one disc is connected to one side shaft and the other disc is connected to another side shaft. High viscosity silicon oil is filled into the cylindrical container and the container is sealed. The silicon oil fills the spaces between the pairs of discs and functions to transfer power. Thus the silicon oil provides connection to both shafts in a uniform motion or in a differential motion. Also, such four wheel drive systems are structurally classified by (1) the center differential gear and the viscous coupling disposed in the front wheel differential gear or (2) the viscous coupling disposed between the rear axle shafts in order to eliminate the rear wheel differential gear.

SUMMARY OF THE INVENTION

Accordingly, it is an object of the present invention to provide an improved full time four wheel drive system.

Another object of the present invention is to provide an improved full time four wheel drive system including a central differential gear assembly, a front wheel differential gear assembly, and a viscous coupling assembly disposed in a parallel relationship on the crossing portion of a front axle shaft and a propeller drive shaft for uniformly distributing the load and simplifying the structure thereof.

A further object of the present invention is to provide an improved full time four wheel drive system including a central differential gear assembly, a viscous coupling assembly and a front wheel differential gear assembly disposed in parallel within a housing in the vicinity of an engine and transmission, and a rear wheel differential gear assembly disposed on the crossing portion of a propeller drive shaft and a rear axle shaft for effectively operating the four wheel drive system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a full time four wheel drive system comprising a housing in the vicinity of an engine and a transmission, a central differential gear assembly, and a viscous coupling assembly containing a front wheel differential gear assembly. The central differential gear, front wheel differential gear, and viscous coupling assemblies are disposed in a parallel relationship within the housing for uniformly distributing the load of axle and drive shafts from the road conditions. The present invention possesses a simple structure, and economically uses the space in the engine compartment.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an enlarged top plan view containing cutaway portions of the construction of the apparatus according to the present invention.

DESCRIPTION OF THE PREFERRED EMBODIMENTS

Figure 1:
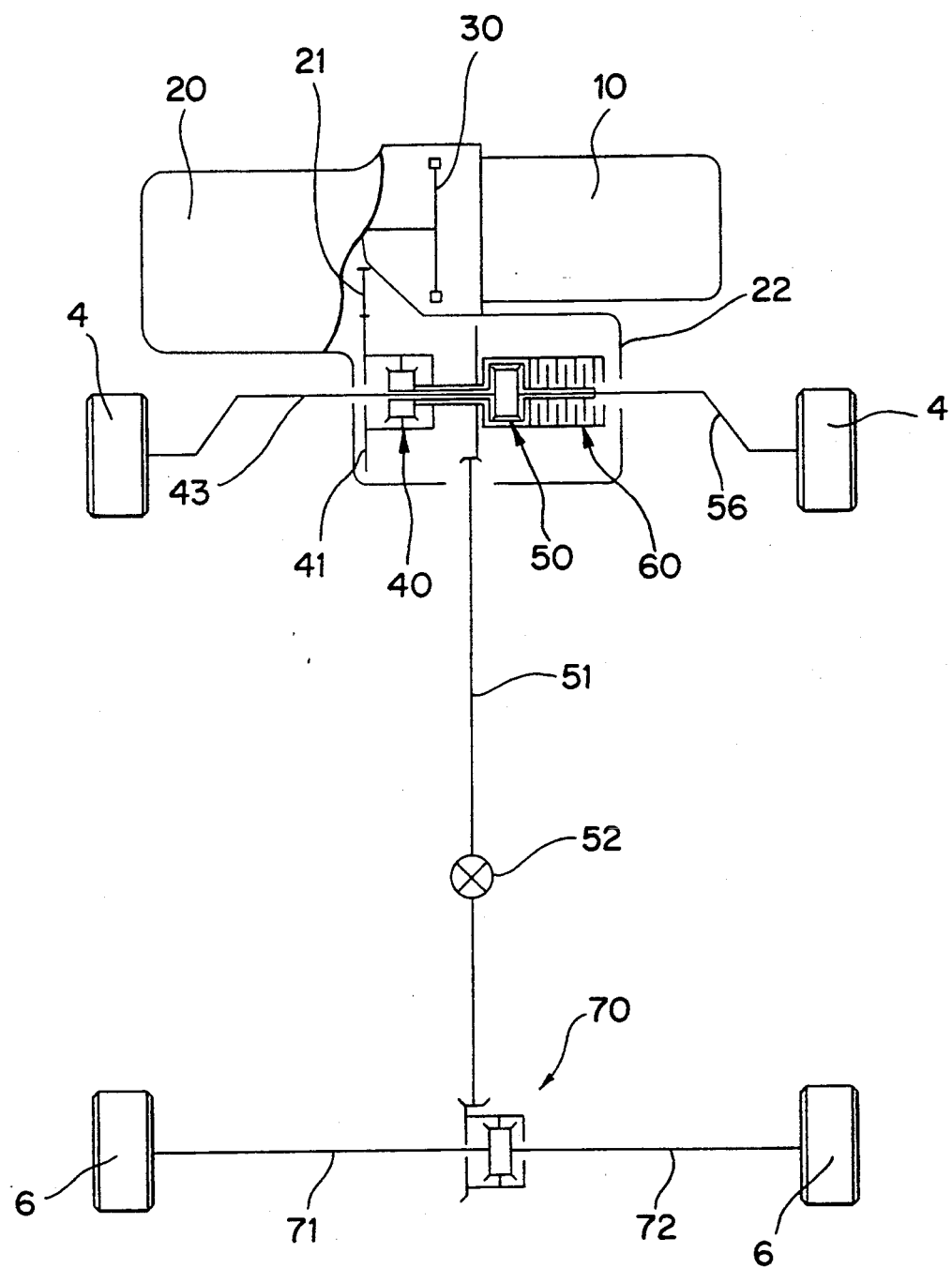
FIG. 1 illustrates a power train of the full time four drive system according to the present invention.

Referring now in detail to the drawings for the purpose of illustrating the preferred embodiments of the present invention, the improved full time four wheel drive system as shown in FIGS. 1 and 2 comprises a housing 22 the vicinity of an engine 10 and a transmission 20 for transferring the power from the engine 10 through a clutch 30.

The housing 22 contains a central differential gear assembly 40, a front wheel differential gear assembly 50, and a viscous coupling assembly 60 disposed in a parallel relationship therein. The transmission 20 is provided with an output transfer gear 21 disposed therein. The output transfer gear 21 is geared with a vertical driving gear 41 connected to the central differential gear assembly 40 through bolts 65. The central differential gear assembly 40, the front wheel differential gear assembly 50, and the viscous coupling assembly 60 are all three disposed in parallel within the housing 22. Also the central differential gear, front wheel differential gear, and viscous coupling assemblies 40, 50, and 60 are all three disposed on left and right front axle shafts 43 and 56 connected to front wheels 4. A propeller drive shaft 51 is geared with a rear wheel differential gear assembly 70 through a universal joint 52 for transferring power of the engine 10 to rear axle shafts 71 and 72 and rear wheels 6 therethrough.

The central differential gear assembly 40 is provided with a central differential housing 42 operatively connected to the output transfer gear 21 of the transmission 20 through the vertical driving gear 41 and a front wheel cylindrical differential shaft 54 including the left front axle shaft 43 disposed therewithin. The front wheel cylindrical differential shaft 54 is connected to a first side bevel pinion gear 44 disposed within the central differential housing 42. A second side bevel pinion gear 45 disposed within the central differential housing 42 is connected to a tubular shaft 48 enclosing the front wheel cylindrical differential shaft 54 within the tubular shaft 48. The first and second side bevel pinion gears 44 and 45 form a differential gear unit with a pair of ring bevel pinion gears 46 and 47 disposed within the central differential housing 42. The pair of central bevel pinion gears 46 and 47 are geared with both first and second side bevel pinion gears 44 and 45, respectively. The tubular shaft 48, rotatably surrounding cylindrical differential shaft 54, is connected to a viscous coupling container 61 of viscous coupling assembly 60.

A drive gear 49 disposed between the central differential housing 42 and the viscous coupling container 61 is connected to a circumferential outer surface of the tubular shaft 48 and geared with a bevel pinion gear 52 of the propeller drive shaft 51. A front wheel cylindrical differential shaft 54 is connected to the front wheel differential housing 53 of the front wheel differential gear assembly 50. A second front wheel cylindrical differential shaft 54' is connected to the front wheel differential housing 53 and passes through the viscous coupling.

The viscous coupling assembly 60 includes the container 61 containing a plurality of outer and inner plates 63 and 64 which are alternately disposed with respect to each other. The outer plates 63 are connected to the inner surface of the viscous coupling container 61 through a serration joint, while the inner plates 64 are connected to the outer surface of the front wheel cylindrical differential shaft 54 through a serration joint. Also, the viscous coupling container 61 contains a high viscosity silicon oil and is sealed.

The front wheel differential gear assembly 50 is disposed within the viscous coupling container 61 of the viscous coupling assembly 60. The front wheel differential gear assembly 50 includes a pair of side bevel pinion gears 58 and 59 and a pair of ring bevel pinion gears 55 and 56 symmetrically disposed about left front axle shaft 43 and a right front axle shaft 56, and a cross shaft 57, respectively.

The propeller drive shaft 51 is connected to a rear wheel differential gear assembly 70 through a universal joint 52 for transferring back up the driving load on the rear wheels 6 back up to the outer plates 63 through the second side bevel pinion gear 45, the tubular shaft 48, and the viscous coupling container 61. Also, the driving force of the front wheels 4 is transferred to the inner plates 64 through the first side bevel pinion gear 44 and the front wheel cylindrical differential shaft 54. The rear wheel differential gear assembly 70 has a structure similar to that of the front wheel differential gear assembly 50.

Since the outer and the inner plates 63 and 64 are disposed within the viscous coupling container they mutually transmit the driving load through the silicon oil as a transferring agent. If the outer plates 63 have a different driving load from the inner plates 64, the difference of the driving loads and inner plates generates a torque and the generated torque must be distributed forcefully to the low turning side in order to even out and mutually distribute the driving of the engine. Therefore, the driving force of the engine 10 is automatically distributed according to the load which exists on the front and the rear wheels 4 and 6 due to the road conditions.

For example, when the load of the front wheels 4 is larger than that of the rear wheels 6, the torque of the inner plates 64 is smaller than that of the outer plates 63. However, at this moment, by the torque controlling mechanism of the viscous coupling assembly 60, the torque to be distributed to the rear wheels 6 is decreased and simultaneously the torque to be distributed to the front wheels 4 is increased. Therefore, the driving of the vehicle can be smoothly continued in accordance with the road conditions.

Furthermore, since the front wheels 4 and the rear wheels 6 have the separate front wheel differential gear assembly 50 and the rear wheel differential gear assembly 70, respectively, when driving in a curve, the front right wheel 4 and the front left wheel 4 or the rear right wheel 6 and the rear left wheel 6 are differently driven from each other. Accordingly, the full time four wheel drive system according to the present invention includes the viscous coupling assembly 60 symmetrically disposed between the central differential gear assembly 40 and the front wheel differential gear assembly 50 for uniformly distributing the load. Also, the full time four wheel drive system according to the present invention is simple in construction and economically utilizes space in the engine chamber compartment.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A full time four wheel drive system for use in a vehicle having front and rear wheels, said system comprising:
   an engine for producing power;
   a transmission operatively connected to said engine;
   a central differential gear assembly operatively connected to receive power from said transmission;
   said central differential gear assembly comprises:
   a central differential housing;
   a first and second side bevel gears;
   a first front wheel cylindrical differential shaft connected to said first side bevel gear;
   a front axle shaft located within said first front wheel cylindrical differential shaft;
   a tubular shaft connected to said second side bevel gear, said front axle shaft and front wheel cylindrical differential shaft located within said tubular shaft; and
   a pair of ring bevel gears supported on said central differential housing; said first and second side bevel gears being symmetrically disposed from each other and geared with said pair of ring bevel gears;
   a second front wheel cylindrical differential shaft;
   a viscous coupling assembly operatively connected to said central differential gear assembly;
   said viscous coupling assembly comprises:
   a viscous coupling retainer attached to said tubular shaft;
   a plurality of inner plates contained within said viscous coupling container and fixed to said second front wheel cylindrical differential shaft;
   a plurality of outer plates contained with said viscous coupling container and fixed to an internal surface of said viscous coupling container; said inner and outer plates are alternately disposed with respect to one another and are positioned a fixed distance apart; and
   a high viscosity oil disposed within said viscous coupling container; said oil and said inner and outer plates cooperating to transfer torque between said tubular shaft and said front wheel cylindrical differential shaft;

a front wheel differential gear assembly operatively connected to said central differential assembly and enclosed within said viscous coupling assembly;

said second front wheel cylindrical differential shaft being connected to a housing of said front wheel differential gear assembly;

a drive shaft transmitting power to said rear wheels; and a rear wheel differential gear assembly connected to said drive shaft through a universal joint;

said central differential gear assembly, said viscous coupling assembly, and said front wheel differential gear assembly being disposed in a parallel relationship in a housing located adjacent to said engine and said transmission; and said viscous coupling being effective to control and uniformly distribute power from said engine to said front and rear wheels at all times when the vehicle is being driven.

2. The full time four wheel drive system of claim 1, further comprising a drive gear connected to an outer surface of said tubular shaft, said drive gear being disposed between said central differential gear assembly and said viscous coupling container.

3. The full time four wheel drive system of claim 1, wherein said vehicle has left and right front axle shafts and said central differential gear assembly and said viscous coupling assembly are disposed on said left front axle shaft of the vehicle.

* * * * *

UNITED STATES PATENT AND TRADEMARK OFFICE
CERTIFICATE OF CORRECTION

PATENT NO. : 5,167,293
DATED : December 1, 1992
INVENTOR(S) : S.C. PARK et al.

It is certified that error appears in the above-identified patent and that said Letters Patent is hereby corrected as shown below:

On the title page:

In Section [75] Inventors: change "Shin Sang Lee" to --Sang Shin Lee--

Signed and Sealed this

Fifteenth Day of February, 1994

*Attest:*

BRUCE LEHMAN

*Attesting Officer*    *Commissioner of Patents and Trademarks*